United States Patent [19]

Brewer

[11] Patent Number: 5,025,714
[45] Date of Patent: Jun. 25, 1991

[54] TEA MAKER

[75] Inventor: Alan W. Brewer, Divernon, Ill.

[73] Assignee: Bunn-O-Matic Corporation, Springfield, Ill.

[21] Appl. No.: 496,887

[22] Filed: Mar. 21, 1990

[51] Int. Cl.⁵ .......................... A47J 31/46; A23F 3/16
[52] U.S. Cl. ........................................ 99/300; 99/295
[58] Field of Search ................ 99/279, 295, 299, 300, 99/302 R, 304, 305, 306, 307; 426/433

[56] References Cited

U.S. PATENT DOCUMENTS

| | | | |
|---|---|---|---|
| Re. 25,663 | 10/1964 | Bunn | 99/305 |
| 3,385,201 | 5/1968 | Martin | 99/295 |
| 3,520,247 | 7/1970 | Hester | 99/305 |
| 3,584,568 | 6/1971 | Hausman | 99/282 |
| 3,793,934 | 2/1974 | Martin | 99/304 |
| 4,064,795 | 12/1977 | Ackerman | 99/304 |
| 4,147,097 | 4/1979 | Gregg | 99/305 |
| 4,579,048 | 4/1986 | Stover | 99/295 |
| 4,621,571 | 11/1986 | Roberts | 99/305 |
| 4,784,051 | 11/1988 | Häuslein | 99/299 |
| 4,809,594 | 3/1989 | Vitous | 99/295 |
| 4,867,048 | 9/1989 | Brewer | 99/295 |
| 4,920,871 | 5/1990 | Anson et al. | 99/295 |

Primary Examiner—William A. Cuchlinski, Jr.
Assistant Examiner—John L. Beres
Attorney, Agent, or Firm—Trexler, Bushnell, Giangiorgi & Blackstone, Ltd.

[57] ABSTRACT

A beverage brewing apparatus for brewing beverage concentrates and mixing these concentrates with dilution water prior to being disposed into a common decanter. A common fill basin is provided to supply the water requirements for both the brewing of the concentrate as well as the dilution of the concentrate. Brewing is initiated upon filling the basin to a predetermined level, after which, at a second predetermined level, dilution water is permitted to flow. At a first predetermined basin level, the brewing water ceases to be transported to the beverage brewing substance, however, the dilution water continues to flow until the basin is drained.

7 Claims, 1 Drawing Sheet

TEA MAKER

BACKGROUND OF THE INVENTION

This invention relates generally to the beverage brewing arts and more particularly to an apparatus for brewing a beverage.

Some currently available beverage brewing devices provide essentially instantaneous hot water to brew beverages in a short amount of time. These devices typically have a hot water reservoir which maintains a volume of water at a predetermined temperature. A cold water fill tube is attached inside the reservoir, one end close to but not abutting the bottom of the hot water reservoir, the other end projecting into a bottom portion of a separate cold water reservoir or basin positioned above the heated reservoir. A hot water discharge tube has one end positioned in the hot water reservoir near an outlet zone generally at the top of the hot water reservoir. Another end of the discharge tube delivers hot water transported through the tube to a beverage brewing substance in order to produce a brewed beverage concentrate.

In order to brew a beverage in a beverage brewing device as described above, cold water is poured into the basin. The cold water flows through the cold water fill tube and accumulates at the bottom of the hot water reservoir due to temperature variations between the cold and hot water. The hot water is displaced by the cold water and moves upwardly towards the top of the hot water reservoir, which is sealed by a cover, and through the hot water discharge tube. Upon being dispensed into a beverage brewing substance, the hot water and beverage brewing substance create a brewed beverage concentrate.

An example of such an instantaneous hot water beverage brewing apparatus is shown in U.S. Pat. No. 3,385,201 to Martin for brewing coffee. Another apparatus has been suggested in order to meet the special requirements of brewing tea as is shown in U.S. patent application Ser. No. 07/360,134 to Anson et al., filed June 1, 1989. The brewing funnel of the tea brewing device is constructed in order to provide an inner concentrate brewing funnel which is generally concentric with the outer funnel. A gap formed between the two funnels permits dilution water to by-pass the brewing substance retained in the inner funnel. The cold water is mixed with the brewed concentrate upon being dispensed from a common outlet nipple formed in the bottom of the brewing funnel.

Dilution of the brewed concentrate is necessary in order to prevent the brewed concentrate from being too strong as well as preventing an additional manual step of diluting the concentrate after it has been brewed. Dilution of the brewed concentrate is achieved by feeding water from the basin to the area between the inner brewing funnel and the outer brewing funnel. In the device as shown in U.S. patent application Ser. No. 07/360,134 to Anson et al., a dilution line formed of a hollow tube extends from the bottom of the basin to the cold water by-pass portion of the brewing funnel. One end of the brewing line is connected to the bottom of the cold water basin, the other end of the line connects at an upper portion in communication with the cold water by-pass gap. Water poured into the basin simultaneously flows into the cold water fill tube as well as the dilution line.

As shown in the device of Anson et al., the dilution line is mounted directly to the bottom of the basin such that dilution water flows into the by-pass gap as soon as water is poured into the basin. Since there is no brewed concentrate to dilute until the water level in the basin rises sufficiently high to flow into the cold water fill tube and displace the hot water in the hot water reservoir, the dilution water merely flows through the by-pass gap without diluting any beverage concentrate. While the operation of this type apparatus has been generally satisfactory, in some instances there may be a deviation from optimum ratio's between the flow of brewing water and dilution water.

OBJECTS AND SUMMARY OF THE INVENTION

A general object of the present invention is to provide a beverage brewing apparatus which provides dilution of a brewed beverage concentrate after the concentrate has been allowed to brew.

A further general object of the present invention is to provide a novel apparatus of the above described type which a desired ratio between the amounts or flows of brewing water and dilution water may be achieved.

Another object of the present invention is to provide a beverage brewing apparatus which provides dilution of a brewed concentrate prior to being disposed in a common decanter.

Yet another object of the present invention is to provide a beverage brewing apparatus which permits the flow of dilution water even after the flow of concentrate brewing water has ceased.

Briefly and in accordance with the following, a beverage brewing apparatus brews beverage concentrates and mixes these concentrates with dilution water prior to being disposed into a common decanter. The present invention provides a common fill basin to supply the water requirements for both the brewing of the concentrate as well as the dilution of the concentrate. Brewing is initiated upon filling the basin to a predetermined level after which, at a second predetermined level, dilution water is permitted to flow. At a first predetermined basin level, the brewing water ceases to be transported to the beverage brewing substance, however, the dilution water continues to flow until the basin is drained.

BRIEF DESCRIPTION OF THE DRAWINGS

The organization and manner of the operation of the invention, together with the further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
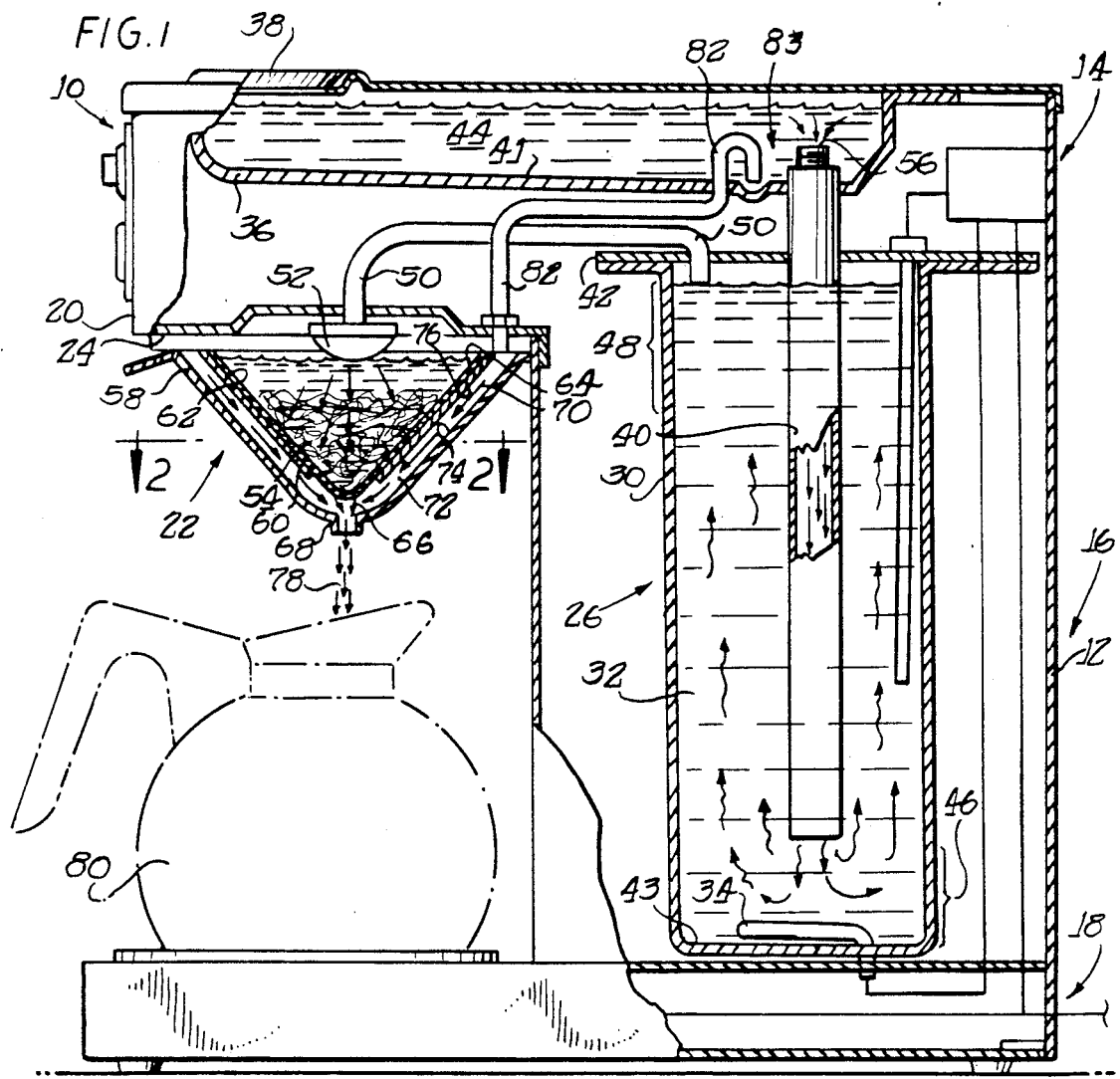
FIG. 1 is a partial fragmentary side sectional view of a beverage brewing device of the type employing the present invention.

While this invention may be susceptible to embodiment in different forms, there is shown in the drawings and will herein be described in detail, a specific embodiment with the understanding that the present disclosure is to be considered an exemplification of the principals of the invention, and is not intended to limit the invention to that as illustrated and described herein.

As illustrated in FIG. 1, a beverage brewing apparatus 10 has a body portion 12 comprising an upper body portion 14, mid-body portion 16 and platform portion 18. The upper body portion 14 extends away from the mid-body portion 16 forming an overhanging portion 20. A brewing funnel 22 is removably retained underneath a downwardly facing surface 24 of the overhanging portion 20.

The beverage brewing device 10 illustrated in FIG. 1, employs a hot water reservoir 26 to maintain a predetermined quantity of hot water on demand for essentially instantaneous brewing. Generally, the hot water reservoir 26 is positioned in the mid-body portion 16 and comprises a walled container 28 having a sealed top 30. Water 32 retained in the container 28 is heated by a heating device 34 such as a resistance heating element of known construction.

A basin 36 is located generally relatively higher than the hot water reservoir 26 to permit water disposed therein to flow into the hot water reservoir 26 under force of gravity The basin 36 is typically formed in a top portion of the upper body portion 14 with a fill opening 38 for receiving brewing water. A cold water fill tube 40 provides a path through which water flows from the basin 36 into the hot water reservoir 26. The fill tube 40 extends from a bottom surface 41 of the basin 36 downwardly through a top cover 42 of the reservoir 26 towards the bottom 43 of the reservoir 26. By introducing cold water 44 from the basin 36 into a bottom region 46 of the hot water reservoir 26, hot water 32 in an upper output region 48 is upwardly displaced towards the top 28 and forced out through a discharge tube 50 connected thereto.

The amount of cold water 44 poured into the cold water basin 36 and thereby introduced into the hot water reservoir 26, displaces an equal volume of hot water 32 which is forced through the hot water discharge tube 50. The discharge tube 50 transports the hot water 32 from the reservoir 26 to a spray head 52 which distributes the hot water over a beverage brewing substance 54 disposed within the beverage brewing funnel 22. Cold water 44 continues to be discharged from the cold water basin 36 into the fill tube 40 until the water level in the basin 36 drops below a top edge 56 of the portion of the fill tube 40 projecting into the basin 36. Once the water level in the basin 36 drops below the top edge 56, water ceases to flow through the fill tube 40 and therefore ceases to force hot water 32 out of the hot water reservoir 26.

Figure 2:
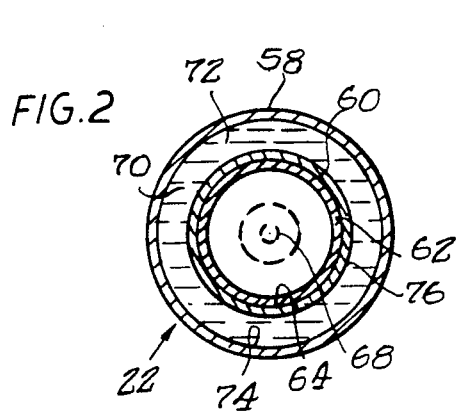
FIG. 2 is a sectional plan view taken along line 2—2 in FIG. 1.

As illustrated in FIG. 1, and further detailed in FIG. 2, the funnel 22 is formed with an external frustoconical shaped funnel 58 and an internal generally complementary frustoconical funnel 60 of slightly smaller dimensions than the external funnel 58. A filter material 62 lines an inside surface 64 of the internal funnel 60 for retaining a beverage brewing substance 54 disposed therein. The internal funnel 60 is formed without a bottom such that brewed beverage concentrate (indicated by arrows 66) passes from the internal funnel 60 to the external funnel 58. Fluid is drained from the external funnel 58 through a funnel nipple 68 generally formed in the center of the bottom-most portion of the external funnel 58.

Beverages, for example tea, brewed in this type of device typically require dilution of the brewed beverage concentrate 66 before consumption. Therefore, dilution water (indicated by arrows 70) is introduced to the beverage concentrate 66 by means of a gap 72 formed between the inwardly facing surface 74 of the external funnel 58 and the outwardly facing surface 76 of the internal funnel 60. The gap 72 directs dilution water 70 through the funnel 22 and prevent mixture with the beverage brewing substance 54 downwardly towards the bottom of the funnel 22. Dilution water 70 and brewed beverage concentrate 66 are thoroughly mixed in a common beverage stream 78 discharged through the funnel nipple 68 into a beverage decanter 80 therebelow.

As shown in the cross-section of FIG. 2, the passage 72 extends completely around the outwardly facing surface 76 of the internal funnel 60 as well as the inwardly facing surface 74 of the external funnel 58. Out flow mixing of brewed concentrate 66 and dilution water 70 permits sufficient infusion of the beverage brewing substance 54 with heated water 32 and dilution water 70 employing the same device and a common source of water.

The beverage brewing substance 54 is infused with beverage brewing water to produce the beverage concentrate 66. A degree of resistance to the water flowing through the beverage brewing substance 54 is developed creating an accumulation of brewing water within the internal funnel 60. The accumulation of fluids in the internal funnel 60 provide intimate contact between the beverage brewing substance 54 and the brewing water which tend to extend the time during which the fluids passing therethrough.

Figure 3:
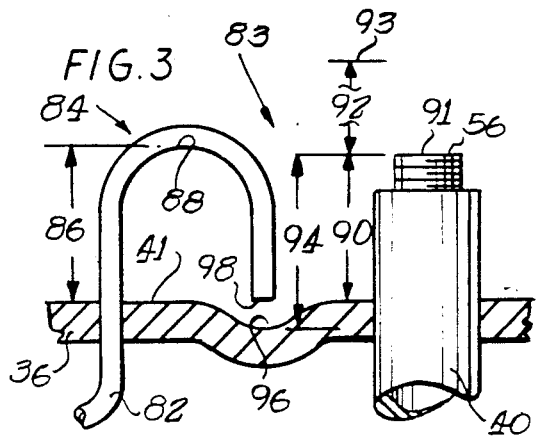
FIG. 3 is an enlarged view of the relationship between a dilution line with a siphon break-over portion and a cold water fill tube disposed within a common cold water basin.

As illustrated in FIG. 1, with further reference to FIG. 3, dilution water 70 flows into the gap 72 of the brewing funnel 22 by means of a dilution line 82. The dilution line 82 extends from the basin 36 to the overhanging portion 20 in cooperative communication with the gap 72 to dispose the dilution water 70 therein. Dilution water flow regulating means or break over siphon 84 is formed on the end of the dilution line 82 which extends into the basin 36. The break over siphon 84 is an inverted U-shaped portion of the dilution line 82 which permits water to flow through the dilution line only when the water level in the basin 36 is of a sufficient predetermined height. When the water level in the basin 36 is greater than the height 86 of a bend 88 in the break over siphon 84 water begins to flow through the discharge line 82.

The top edge 56 of the fill tube 40 is adjustable to control the relative relationship of water passing from the basin 36 into either the reservoir 26 or the dilution line 82. In order to initiate brewing prior to dilution, the top edge 56 is adjusted so that a height 90, measured between the bottom 41 of the basin 36 and the top edge 56, is less than the height 86 at which water starts flowing through the dilution line 82. Generally, in order to achieve the desired dilution results, dimension 90 will be less than dimension 86.

Controlled dilution of the brewed beverage is achieved by appropriately adjusting the adjustable barrel or fitting 91 which is threaded into the upper end of the fill tube 40. Water disposed in the basin 36 is identifiable as a first quantity 92 and a second quantity 94. The first quantity 92 is defined as a portion of the total quantity of water initially poured into the basin 36 above the top edge 56 of the fill tube 40. This first quantity 92 is used both for brewing the beverage as well as diluting the beverage. A portion of the first quantity 92 flows into the reservoir 26 through the fill tube 40 and into the beverage brewing substance 54 via the discharge tube 50.

Allocation of the first volume 92 is determined by the relative diameters as well as the relative heights of the dilution line 82 and the fill tube 40. Generally, the dilution line 82 has a smaller diameter than the fill tube 40. A greater volume of water is initially discharged into the beverage brewing substance 54 than flows through the dilution line 82 since the water discharged into the beverage brewing substance 54 is intended to slowly discharge therefrom to permit sufficient infusion. Whereas, dilution water 70 flows through the dilution line 82, generally constantly while brewed beverage concentrate 66 drains from the internal funnel 60.

Once all of the water in the first volume 92 has drained from the basin 36, the second volume 94 is used solely for dilution water 70. Initially, when water is disposed into the basin 36, the first volume 92 is sufficient to prime the dilution line 82 and therefore initiate flow through the break over siphon 84. Since a siphon is established in the dilution line 82, even after the first volume 92 has drained, the second volume 94 continues to drain from the basin 36 under the influence of the siphon in the dilution line 82. A depression 96 is formed in the bottom 41 of the basin 36 and a free end 98 of the break over siphon 84 is positioned over this depression 96. The relative position of the free end 98 with respect to the depression 96 results in essentially draining all of the water out of the basin 36 since the depression 96 is the lowest level in the basin 36.

In use, water is poured into the fill opening 38 formed in the upper portion 14 in order to fill the basin 36. Alternatively, the basin could be filled automatically from a valve controlled pressurized water line, now shown, in a known manner. For example, reference is made to Martin U.S. Pat. No. 3,691,933; Stover U.S. Pat. No. 4,464,981 and Zimmerman U.S. Pat. No. 4,478,139.

Water 44 disposed in the basin 36 flows through the fill tube 40 into the reservoir 26 to displace heated water 32 retained therein upwardly through a discharge line 50. The water flowing through the discharge line 50 flows into the beverage brewing substance 54 retained in the internal funnel 60 of the brewing funnel 22. As beverage concentrate 66 flows from the infused beverage brewing substance 54, dilution water 70 flowing from the basin 36 through the dilution line 82 flows through the gap 72 to mix with the brewed beverage concentrate 66. Heated water flows into the beverage brewing substance 54 until the first volume of water 92 in the basin 36 has been depleted. Upon depletion of the first volume 92 of water, brewing water ceases to flow through the discharge tube 50. Dilution water 70, however, continues to flow until the second volume of water 94 is depleted The second volume of water 94 is siphoned out of the basin 36 under the influence of the siphon created in the dilution line 82. The break over siphon 84 formed on the end of the dilution line 82 projecting into the basin 36 prevents dilution water 70 from automatically flowing into the gap 72 when water is poured into the basin 36. Instead, water first flows into the fill tube 40 and thereby discharges water into the beverage brewing substance 54 before dilution water 70 begins to flow. As a result of employing the break over siphon 84, a controlled volume of water is used to brew the beverage even in the situation where water is slowly poured into the basin 36 and the proper ratio between brewing water and dilution water is maintained.

While a preferred embodiment of the present invention is shown and described, it is envisioned that those skilled in the art may devise various modifications of the present invention without departing from the spirit and scope of the appended claims.

The invention is claimed as follows:

1. An improved beverage apparatus for brewing beverage concentrates and diluting said beverage concentrates, said apparatus comprising: a reservoir for retaining a quantity of brewing water; a fill basin for receiving brewing and diluting water; a fill tube operatively attached to and extending from said basin to said reservoir for transporting water from said basin to said reservoir; a brewing water line extending from said reservoir for discharging brewing water into a brewing substance in a substance retainer for producing a brewed concentrate; a dilution water line in communication with and extending from said basin for discharging water for mixing with said concentrate; and flow regulating means for said brewing water and said dilution water, said flow regulation means comprising means for controlling the flow of dilution water from said basin, said flow regulating means preventing flow of dilution water prior to discharging water from said basin to said reservoir such that dilution water begins to flow at least not substantially before the discharge of brewing water from said brewing water line.

2. An improved beverage brewing apparatus according to claim 1, wherein said flow regulating means comprises an inverted U-shaped portion of said dilution water line extending into said fill basin, a free end of said inverted U-shaped portion directed toward a bottom surface of said basin, said U-shaped portion preventing water in said basin from flowing through said dilution water line when less than a predetermined volume of water is disposed in said basin and creating a siphon in said dilution line when at least a predetermined volume of water is disposed in said basin.

3. An improved beverage brewing apparatus according to claim 2, wherein said fill tube extends a distance above the bottom surface of said basin and below a water level of a predetermined volume of water; said U-shaped portion being curved at a position between a top edge of said fill tube and a water level of a predetermined volume of water; said predetermined volume of water comprising a first volume and a second volume, said first volume comprising water in said basin between said top edge of said fill tube and said water level, said second volume comprising water in said basin between said top edge of said fill tube and the bottom of said basin, said first volume providing water for brewing said beverage and initiating dilution of said beverage and said second volume providing dilution water.

4. An improved beverage brewing apparatus according to claim 2, wherein said fill tube adjustably extends into said basin a distance above the bottom of said basin; a predetermined volume of water having a corresponding water level when disposed in said basin, said predetermined volume of water comprising a first volume and a second volume, said first volume comprising water in said basin between said top edge of said fill tube and said water level, said second volume comprising water in said basin between said top edge of said fill tube and the bottom of said basin, said first volume comprising water for brewing said beverage and initiating dilution of said beverage and said second volume providing dilution water; said U-shaped portion being fixed in said basin and curved at a position between the lowest adjustment of said top edge of said adjustable fill tube relative to the bottom of said basin and a water level of a predetermined volume of water; said fill tube being adjusted upwardly for decreasing the volume of water in said first volume used for brewing and for increasing the volume of water in said second volume, said fill tube being adjusted downwardly for increasing the volume of water in said first volume used for brewing and for decreasing the volume of water in said second volume.

5. An improved beverage brewing apparatus according to claim 2, wherein a relative diameter of said dilution line is substantially smaller than a relative diameter of said fill tube.

6. An improved beverage brewing apparatus according to claim 3, wherein a depression is formed in the bottom surface of said basin and said free end of said U-shaped portion of said dilution line extends a distance therein for draining water into said depression as said basin is drained to maximize the volume of water drained from said basin.

7. In a beverage brewing apparatus for brewing and diluting beverages from a common water source, dilution water flow regulating means for controllably diluting a brewed beverage, said apparatus comprising: reservoir means for retaining a predetermined volume of water; a basin for receiving water for brewing and diluting beverages in said apparatus; an elongate fill tube connecting said basin and said reservoir for transporting a brewing portion of water disposed in said basin into said reservoir; a substance retainer positioned proximate said reservoir for retaining a beverage brewing substance from which a beverage concentrate is extracted when infused with brewing water from said reservoir, a dilution line in communication with and extending from said basin to said substance retainer for transporting dilution water from said basin to said substance retainer, said dilution water mixing with said beverage concentrate extracted from said beverage brewing substance in a common stream discharged from said substance retainer; flow regulating means in said dilution line for controllably discharging a dilution portion of water disposed in said basin for diluting said brewed beverage concentrate, said dilution water flow regulating means comprising an inverted U-shaped portion of said dilution line extending into said basin, a curve in said U-shaped portion being disposed above said top edge of said fill tube for preventing water from flowing through said dilution line prior to flowing through said fill tube.

* * * * *